(12) United States Patent
Gane et al.

(10) Patent No.: US 8,252,142 B2
(45) Date of Patent: Aug. 28, 2012

(54) USE OF A SURFACE-REACTED CALCIUM CARBONATE IN TISSUE PAPER, PROCESS TO PREPARE A TISSUE PAPER PRODUCT OF IMPROVED SOFTNESS, AND RESULTING IMPROVED SOFTNESS TISSUE PAPER PRODUCTS

(75) Inventors: Patrick Arthur Charles Gane, Rothrist (CH); Uwe Gisella, Mühlethal (CH); Maximilian Laufmann, Zofingen (CH); Catherine Jean Ridgway, Mühlethal (CH)

(73) Assignee: Omya Development AG, Oftringen (CH)

(*) Notice: Subject to any disclaimer, the term of this patent is extended or adjusted under 35 U.S.C. 154(b) by 79 days.

(21) Appl. No.: 12/740,084

(22) PCT Filed: Oct. 28, 2008

(86) PCT No.: PCT/IB2008/002874
§ 371 (c)(1),
(2), (4) Date: Apr. 27, 2010

(87) PCT Pub. No.: WO2009/056942
PCT Pub. Date: May 7, 2009

(65) Prior Publication Data
US 2010/0258258 A1    Oct. 14, 2010

(51) Int. Cl.
*D21H 11/00*    (2006.01)
(52) U.S. Cl. ........................................ 162/111
(58) Field of Classification Search .......... 162/111, 162/123, 181.6, 181.1, 158, 181.2; 106/465, 106/431, 471
See application file for complete search history.

(56) References Cited

U.S. PATENT DOCUMENTS

| | | | |
|---|---|---|---|
| 4,351,699 A | 9/1982 | Osborn, III | |
| 4,441,962 A | 4/1984 | Osborn, III | |
| 4,764,418 A | 8/1988 | Kuenn et al. | |
| 4,940,513 A | 7/1990 | Spendel | |
| 5,217,576 A | 6/1993 | Van Phan | |
| 5,223,096 A | 6/1993 | Phan et al. | |
| 5,240,562 A | 8/1993 | Phan et al. | |
| 5,262,007 A | 11/1993 | Phan et al. | |
| 5,279,767 A | 1/1994 | Phan et al. | |
| 5,672,249 A | 9/1997 | Vinson et al. | |
| 6,666,953 B1 * | 12/2003 | Gane et al. | 162/181.2 |
| 6,706,148 B1 | 3/2004 | Joisson et al. | |
| 7,638,017 B2 | 12/2009 | Gane et al. | |
| 2004/0020410 A1 * | 2/2004 | Gane et al. | 106/464 |
| 2004/0118534 A1 | 6/2004 | Anderson | |
| 2006/0162884 A1 | 7/2006 | Gane et al. | |
| 2010/0282127 A1 * | 11/2010 | Gerard et al. | 106/286.6 |

FOREIGN PATENT DOCUMENTS

| | | |
|---|---|---|
| EP | 1029977 A1 | 8/2000 |
| FR | 2 787 802 A1 | 6/2000 |
| FR | 2 852 600 | 9/2004 |
| WO | 9624723 A1 | 8/1996 |
| WO | 9625557 A1 | 8/1996 |
| WO | 9717494 A1 | 5/1997 |
| WO | 9730216 A1 | 8/1997 |
| WO | 9737081 A1 | 10/1997 |
| WO | 9813549 A1 | 4/1998 |
| WO | WO 98/28491 | 7/1998 |
| WO | 0003922 A1 | 1/2000 |
| WO | WO 00/47817 | 8/2000 |
| WO | 0144571 A1 | 6/2001 |
| WO | 02057547 A2 | 7/2002 |
| WO | 2004083316 A1 | 9/2004 |
| WO | 2005121257 A2 | 12/2005 |

OTHER PUBLICATIONS

The International Search Report dated Mar. 4, 2009 for PCT Application No. PCT/IB2008/002874.
The Written Opinion of the International Searching Authority for PCT Application No. PCT/IB2008/002874.
The European Search Report dated Jul. 20, 2009 for European Application No. EP 07 02 1416.

* cited by examiner

*Primary Examiner* — Mark Halpern
(74) *Attorney, Agent, or Firm* — Amster, Rothstein & Ebenstein LLP

(57) ABSTRACT

The present invention relates to the use of a surface-reacted natural calcium carbonate as filler in tissue paper products, to a process to prepare tissue paper products, and to a tissue paper product featuring an improved softness, wherein said surface-reacted natural calcium carbonate is the reaction product of a natural calcium carbonate with an acid and carbon dioxide, which is formed in situ by the acid treatment and/or supplied externally.

25 Claims, 1 Drawing Sheet

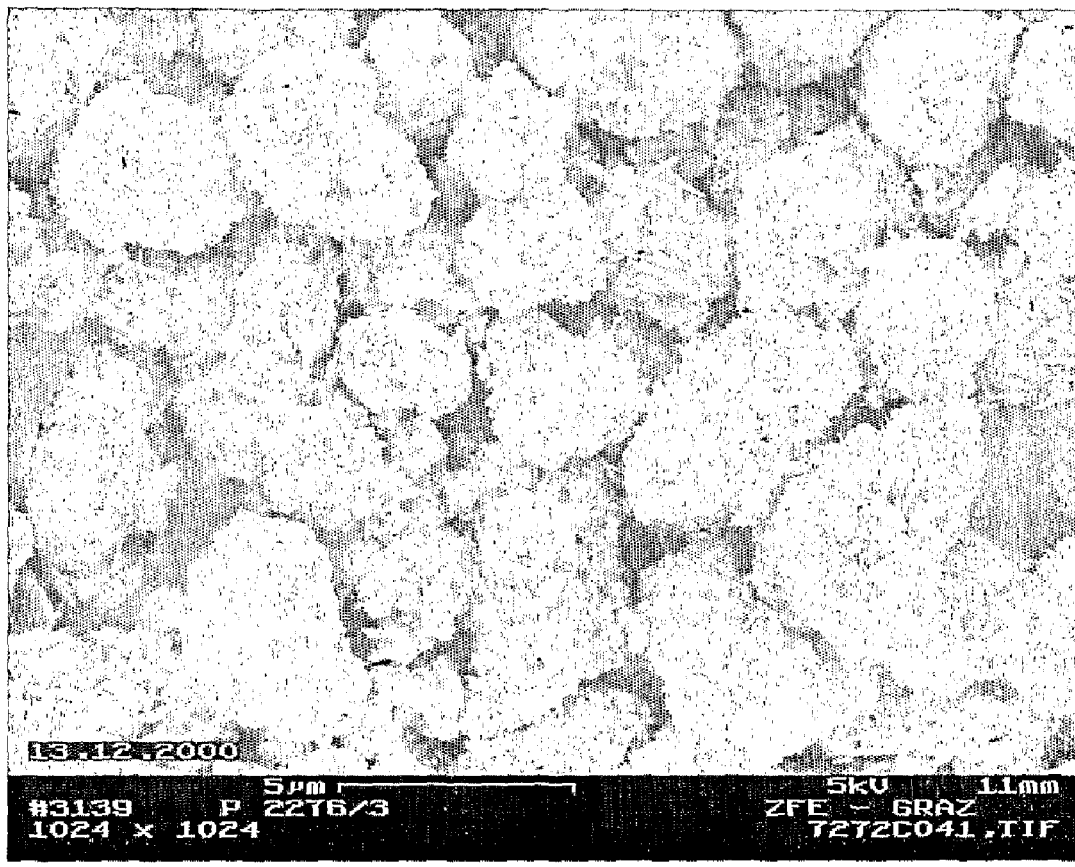

USE OF A SURFACE-REACTED CALCIUM CARBONATE IN TISSUE PAPER, PROCESS TO PREPARE A TISSUE PAPER PRODUCT OF IMPROVED SOFTNESS, AND RESULTING IMPROVED SOFTNESS TISSUE PAPER PRODUCTS

CROSS REFERENCE TO RELATED APPLICATIONS

This application claims the benefit and priority to and is a U.S. National Phase Application of PCT International Application Number PCT/IB2008/002874, filed on Oct. 28, 2008, designating the United States of America and published in the English language, which is an International Application of and claims the benefit of priority to European Patent Application No. 07021416.8, filed on Nov. 2, 2007. The disclosures of the above-referenced applications are hereby expressly incorporated by reference in their entireties.

The present invention relates to the use of a surface-reacted natural calcium carbonate as filler in tissue paper products, to a process to prepare tissue paper products, and to a tissue paper product featuring an improved softness.

Common tissue paper products are mass market products, and include facial tissue, toilet tissue, decorative and gift wrapping tissue such as crepe paper, household and industrial tissue paper towels, tissue paper napkins and paper cloths, such as tissue paper table cloths.

Tissue papers are generally characterised and distinguished from standard copy or printing papers in that they may be likened to textile materials and must meet particular high softness, easy disposability, low weight (basis weight of less than 65 g/m$^2$, or in some cases of less than 40 g/m$^2$ or even less than or equal to 32 g/m$^2$) and, in some cases, particular wet strength requirements. They also differ in that they are often composed of multiple tissue layers termed "plies". Moreover, tissue papers are generally produced via a process referred to in the art as creped tissue papermaking process, though other less-common production processes exist.

Toilet tissue generally features a basis weight of between 14 and 22 g/m$^2$, and may be formed from one to as many as four plies.

Facial tissue often features a slightly lower basis weight of between 14 and 18 g/m$^2$, and mostly comprises two to three plies.

Household tissue paper towels, also known as kitchen towels, present a somewhat higher basis weight of between 20 and 24 g/m$^2$, and rarely feature more than two plies.

One-ply industrial tissue paper towels usually feature a basis weight of 33 to 50 g/m$^2$, whereas their two-ply counterparts have a basis weight of 22 to 24 g/m$^2$.

These tissues may be further distinguished between themselves by the nature of the fibre source (and especially the amount of chemical pulp and recycled fibres they contain), as well as the presence of further additives, such as wet-strength resins.

For all of these tissue types, but especially for facial tissue, tissue paper napkins, toilet tissue and tissue paper cloths, softness represents one of the most important marketing characteristics.

Softness is generally defined in terms of both surface and bulk softness, and is considered to be a function of smoothness, compressibility, stiffness and "crumpability". Traditionally, the degree of tissue softness has been evaluated by hand feel, but more recently quantitative measurement techniques have become available.

For the purposes of the present application, tissue paper softness is evaluated using Emtec Tissue Softness Analyzer technology, as described hereafter.

PRIOR ART

A number of solutions have been proposed to meet the demand for increased tissue paper softness.

A first class of solutions involves the addition of synthetic humectants during tissue paper production. WO 96/25557, for example, describes the application of a soluble polyhydroxy compound to the wet tissue paper web before drying and creping this web to form the final tissue paper. U.S. Pat. No. 4,764,418 provides for the addition of humectants such as polyethylene glycol to the dry web.

A second approach involves adding particular oils and/or waxes to the tissue paper, such as described in WO 96/24723, WO 97/30216, WO 02/057547 and EP 1 029 977. However, both of the above approaches may result in the development of an undesired smell associated with the final tissue paper product, and represent relatively costly means of increasing tissue paper softness.

A third approach calls for the implementation of particular surfactants, possibly in combination with further additives, as described, among others, in U.S. Pat. No. 4,940,513, U.S. Pat. No. 4,351,699 and U.S. Pat. No. 4,441,962.

A fourth approach refers to the implementation of particular chemical debonders, as described, among others, in U.S. Pat. No. 5,217,576; U.S. Pat. No. 5,223,096; U.S. Pat. No. 5,240,562; U.S. Pat. No. 5,262,007 and U.S. Pat. No. 5,279,767.

The implementation of chemical additives of the above two groups in tissue paper products again represents a relatively costly means of improving tissue paper product softness.

Another approach involves modifying particular aspects of the tissue papermaking process, for example by adding steps to the process, such as calendering following tissue paper web drying, and/or modifying the tissue-papermaking equipment used. In his quest for improved softness, the skilled man can also make particular selections relative to the nature and/or degree of refining of fibres used to form the tissue paper web. However, all of these approaches leave the skilled man in need of a simple, cost-effective solution that can be readily implemented in a broad range of tissue papermaking processes and using a wide range of additives, and including standard fibres.

Considering the drawbacks of the known solutions to the problem of providing softness to tissue paper mentioned above, it is an object of the present invention to provide a novel solution to this problem.

The object outlined above has surprisingly been solved by the use of a surface-reacted natural calcium carbonate as filler in a tissue paper product, the surface-reacted natural calcium carbonate being the reaction product of a natural calcium carbonate with an acid and carbon dioxide, which is formed in situ by the acid treatment and/or supplied externally, and the surface-reacted natural calcium carbonate being prepared as an aqueous suspension having a pH of greater than 6.0, measured at 20° C.

As regards calcium carbonate-based fillers for tissue paper products, the skilled man knows WO 98/28491, which teaches that a strong, soft, filled tissue paper, low in lint and dust, may be obtained by forming a filled tissue paper featuring biased surface characteristics. While preferred fillers include inorganic materials such as clay and calcium carbonate, more preferred embodiments focus solely on clay. No details are provided as to the nature of the calcium carbonate.

Related WO 97/17494 similarly refers to the need for biased surface bonding properties in a tissue paper that contains a particulate filler, which may include calcium carbonate.

WO 97/37081 refers to a process for incorporating a fine non-cellulosic particulate filler into a creped tissue paper, where said process is characterized in that it comprises the steps of:
a) contacting an aqueous dispersion of a non-cellulosic particulate filler with an aqueous dispersion of an anionic polyelectrolyte polymer,
b) mixing the aqueous dispersion of polymer-contacted filler with papermaking fibres forming an aqueous papermaking furnish comprising polymer-contacted filler and papermaking fibres,
c) contacting said aqueous papermaking furnish with a cationic retention aid,
d) forming an embryonic paper web from the aqueous papermaking furnish on foraminous papermaking clothing,
e) removing water from said embryonic web to form a semi-dry papermaking web,
f) adhering the semi-dry papermaking web to a Yankee dryer and drying said web to a substantially dry condition,
g) creping the substantially dry web from the Yankee dryer by means of a flexible creping blade, thereby forming a creped tissue paper.

Among other options, this fine non-cellulosic particulate filler may be calcium carbonate. Other than describing a preferred filler average equivalent spherical diameter of between 0.5 μm and 5 μm, no further information is given with reference to the filler or more specifically calcium carbonate.

WO 98/13549 refers to a process for producing uncreped, strong, soft and low dusting tissue paper web containing a retentive filler. Said process comprises the steps of:
(a) providing an aqueous suspension of papermaking furnish comprising papermaking fibres and non-cellulosic particulate filler, said particulate filler preferably comprising from about 1% to about 50% of the total weight of said tissue paper, said particulate filler being selected from a group including, among many other options, calcium carbonate, though kaolin clay is indicated as being preferred;
(b) depositing said aqueous suspension of papermaking furnish onto the surface of a travelling foraminous forming fabric to form a wet embryonic papermaking web;
(c) transferring said wet embryonic papermaking web from the forming fabric to a first transfer fabric travelling at a speed from about 5% to about 75% slower than the forming fabric; and
(d) transferring the wet embryonic papermaking web from the first transfer fabric via at least one further transfer to a drying fabric, whereupon said wet embryonic papermaking web is non-compressively dried.

U.S. Pat. No. 5,672,249 refers to a similar process for incorporating a fine non-cellulosic particulate filler into a creped tissue paper, wherein, in particular, starch is implemented and wherein said particulate filler comprises from about 1% to about 50% of the total weight of said creped tissue paper, said particulate filler being selected from a large group of filler options including calcium carbonate. Again, no information is provided regarding the nature of the calcium carbonate.

WO 01/44571 provides for a relatively soft, strong, opaque tissue paper product and a process for making same, involving the incorporation an alkylamide or alkylimide softening agent along with particulate fillers during a non-compressive tissue-formation process. Said particulate filler may, among other options, be a calcium carbonate. Again, no details are provided regarding this calcium carbonate.

US 2004/118534 teaches a creping composition comprising a crosslinkable polymer capable of forming formaldehyde by a condensation reaction during crosslinking, a filler material (which may be calcium carbonate), and a water-soluble glycol compound. A soft feel is among the characteristics of the resulting tissue products. Again, no indication is provided regarding any advantageous calcium carbonate characteristics.

Finally, U.S. Pat. No. 6,706,148 teaches a process for affixing a mineral filler, which may, among other options, be a calcium carbonate, onto an aqueous cellulose-fibre suspension, which may ultimately form a tissue paper. In this process, the corresponding hydroxide of the mineral filler is added to the reaction medium, which includes cellulose-fibres, and this hydroxide thereafter precipitated onto the fibres, thus forming the mineral filler.

As can be seen, the use of calcium carbonate as a filler for tissue paper, while sometimes mentioned in the prior art, is always mentioned a) among other fillers or other options, and b) with no mention nor clue as to the required features of this calcium carbonate, and especially not regarding a specific surface treatment, so that the prior art as a whole fails to provide any indication, direction, or suggestion to the skilled man in this respect.

Surprisingly, the use of the surface-reacted natural calcium carbonate according to the present invention has been found to result in a tissue paper product of improved softness relative to tissue paper products comprising standard calcium carbonate fillers of the prior art. Furthermore, the solution according to the present invention may be implemented in a wide-range of tissue papermaking processes and provides improved softness without the need for additional additives or particular complex tissue-making process steps.

DETAILED DESCRIPTION OF THE INVENTION

Surface Reacted Natural Calcium Carbonate

The surface-reacted natural calcium carbonate used as filler in tissue paper products according to the present invention is obtained by reacting a natural calcium carbonate with an acid and with carbon dioxide, wherein the carbon dioxide is formed in situ by the acid treatment and/or is supplied from an external source.

Preferably, the natural calcium carbonate is selected from a marble, a chalk, a calcite, a dolomite, a limestone, or mixtures thereof. In a preferred embodiment, the natural calcium carbonate is ground prior to the treatment with an acid and carbon dioxide. The grinding step can be carried out with any conventional grinding device (such as a grinding mill) known to the skilled person.

The surface-reacted natural calcium carbonate to be used in the present invention is prepared as an aqueous suspension having a pH, measured at 20° C., of greater than 6.0, preferably greater than 6.5, more preferably greater than 7.0, even more preferably greater than 7.5.

In a preferred process for the preparation of the aqueous suspension, the natural calcium carbonate, either finely divided (such as by grinding) or not, is suspended in water. Preferably, the slurry has a content of natural calcium carbonate within the range of 1 wt % to 80 wt %, more preferably 3 wt % to 60 wt %, and even more preferably 5 wt % to 40 wt %, based on the weight of the slurry.

In a next step (a first treatment step), an acid is added to the aqueous suspension containing the natural calcium carbonate. Preferably, the acid has a $pK_a$ at 25° C. of 2.5 or less. If the $pK_a$ at 25° C. is 0 or less, the acid is preferably selected from sulphuric acid, hydrochloric acid, or mixtures thereof. If the $pK_a$ at 25° C. is from 0 to 2.5, the acid is preferably selected from $H_2SO_3$, $H_3PO_4$, oxalic acid or mixtures thereof. The one or more acids can be added to the suspension as a concentrated solution or a more diluted solution. Preferably, the molar ratio of the acid to the natural calcium carbonate is from 0.05 to 4, more preferably from 0.1 to 2.

As an alternative, it is also possible to add the acid to the water before the natural calcium carbonate is suspended.

In a next step (a second treatment step), the natural calcium carbonate is treated with carbon dioxide. If a strong acid such as sulphuric acid or hydrochloric acid is used for the acid treatment of the natural calcium carbonate, the carbon dioxide is automatically formed. Alternatively or additionally, the carbon dioxide can be supplied from an external source.

Acid treatment and treatment with carbon dioxide can be carried out simultaneously which is the case when a strong acid is used. It is also possible to carry out acid treatment first, e.g. with a medium strong acid having a $pK_a$ in the range of 0 to 2.5, followed by treatment with carbon dioxide supplied from an external source.

Preferably, the concentration of gaseous carbon dioxide in the suspension is, in terms of volume, such that the ratio (volume of suspension):(volume of gaseous $CO_2$) is from 1:0.05 to 1:20, even more preferably 1:0.05 to 1:5.

In a preferred embodiment, the acid treatment step and/or the carbon dioxide treatment step are repeated at least once, more preferably several times.

In a preferred embodiment, the acid treatment and/or carbon dioxide treatment takes place at a slurry temperature of greater than at least 60° C.

Subsequent to the acid treatment and carbon dioxide treatment, the pH of the aqueous suspension, measured at 20° C., naturally reaches a value of greater than 6.0, preferably greater than 6.5, more preferably greater than 7.0, even more preferably greater than 7.5, thereby preparing the surface-reacted natural calcium carbonate as an aqueous suspension having a pH of greater than 6.0, preferably greater than 6.5, more preferably greater than 7.0, even more preferably greater than 7.5. If the aqueous suspension is allowed to reach equilibrium, the pH is greater than 7. A pH of greater than 6.0 can be adjusted without the addition of a base when stirring of the aqueous suspension is continued for a sufficient time period, preferably 1 hour to 10 hours, more preferably 1 to 5 hours.

Alternatively, prior to reaching equilibrium, which occurs at a pH of greater than 7, the pH of the aqueous suspension may be increased to a value greater that 6 by adding a base subsequent to carbon dioxide treatment. Any conventional base such as sodium hydroxide or potassium hydroxide can be used.

With the process steps described above, i.e. acid treatment, treatment with carbon dioxide and pH adjustment, a surface-reacted natural calcium carbonate is obtained that provides softness when implemented in tissue paper.

Further details about the preparation of the surface-reacted natural calcium carbonate are disclosed in WO 00/39222 and US 2004/0020410 A1, the content of these references herewith being included in the present application. According to these documents, the surface-reacted natural calcium carbonate is used as a bulking filler for paper manufacture.

In a preferred embodiment of the preparation of the surface-reacted natural calcium carbonate, the natural calcium carbonate is reacted with the acid and/or the carbon dioxide in the presence of at least one compound selected from the group consisting of silicate, silica, aluminium hydroxide, earth alkali aluminate such as sodium or potassium aluminate, magnesium oxide, or mixtures thereof. Preferably, the at least one silicate is selected from an aluminium silicate, a calcium silicate, or an earth alkali metal silicate. These components can be added to an aqueous suspension comprising the natural calcium carbonate before adding the acid and/or carbon dioxide. Alternatively, the silicate and/or silica and/or aluminium hydroxide and/or earth alkali aluminate and/or magnesium oxide component(s) can be added to the aqueous suspension of natural calcium carbonate while the reaction of natural calcium carbonate with an acid and carbon dioxide has already started. Further details about the preparation of the surface-reacted natural calcium carbonate in the presence of at least one silicate and/or silica and/or aluminium hydroxide and/or earth alkali aluminate component(s) are disclosed in WO 2004/083316, the content of this reference herewith being included in the present application.

In another preferred embodiment of the preparation of the surface-reacted natural calcium carbonate, the natural calcium carbonate is reacted with the acid and/or the carbon dioxide, and treated, before and/or during and/or after this reaction with acid and/or carbon dioxide, with a compound or compounds of formula R—X, where the radical R represents a carbonaceous radical, saturated or not, having 8 to 24 carbon atoms, such as the linear or ramified alkyl, alkylaryl, arylalkyl, aryl, polyaryl or again cyclic groups, or their mixtures, and where the group X represents groups such as carboxylic, amine, hydroxyl, phosphonic, or their mixtures. More particularly, R—X may be chosen from among fatty acids, fatty amines, or fatty alcohols, whether saturated or not, having preferentially 8 to 24 carbon atoms such as, notably, of the stearic, oleic, linoleic, myristic, octylic type, or their own mixtures, and very preferentially 16 to 18 carbon atoms, or their mixtures, with synthetic or natural fatty compounds, preferentially compounds of vegetal origin such as coconut oil, or of animal origin, such as tallow, and very preferentially of vegetal origin. Treatment with a hydrophobising agent can, in some cases, be advantageous in that it may allow for differential absorption by the tissue paper, such that, for example, the tissue paper provides for the absorption of oil and not water when contacted with a mixture of these liquids.

The surface-reacted natural calcium carbonate can be kept in suspension, optionally further stabilised by a dispersant. Conventional dispersants known to the skilled person can be used. The dispersant can be anionic or cationic.

Alternatively, the aqueous suspension described above can be dried, thereby obtaining the surface-reacted natural calcium carbonate in the form of granules or a powder.

In a preferred embodiment, the surface-reacted natural calcium carbonate has a specific surface area of from 5 $m^2/g$ to 200 $m^2/g$, more preferably 20 $m^2/g$ to 80 $m^2/g$ and even more preferably 30 $m^2/g$ to 60 $m^2/g$, measured using nitrogen and the BET method according to ISO 9277.

Furthermore, it is preferred that the surface-reacted natural calcium carbonate has a weight median grain diameter of from 0.1 to 50 μm, more preferably from 0.5 to 25 μm, even more preferably 0.7 to 7 μm, measured according to the sedimentation method. The measurement of weight median grain diameter was performed on a Sedigraph™ 5120 instrument, as described in further detail in the experimental section below.

In a preferred embodiment, the surface-reacted natural calcium carbonate has a specific surface area within the range of 15 to 200 $m^2/g$ and a weight median grain diameter within the range of 0:1 to 50 μm. More preferably, the specific surface area is within the range of 20 to 80 $m^2/g$ and the weight median grain diameter is within the range of 0.5 to 25 μm.

Even more preferably, the specific surface area is within the range of 30 to 60 m$^2$/g and the weight median grain diameter is within the range of 0.7 to 7 µm.

In a preferred embodiment, the surface-reacted natural calcium carbonate features a brightness of 75 to 97% ISO brightness, as measured according to the methods also described in the Examples section below.

In a preferred embodiment, the surface-reacted natural calcium carbonate features an abrasion of less than 3 mg, preferably of less than or equal to 2 mg, and more preferably of less than or equal to 1 mg, as measured according to the method described in the Examples section below.

Process in which the Surface-Reacted Natural Calcium Carbonate is Implemented

In the tissue papermaking process according to the present invention, the surface-reacted natural calcium carbonate is introduced in tissue paper during the tissue papermaking process by any conventional means known to the skilled person, or by any new means developed in future in the art, in order to form a tissue paper product.

The surface-reacted natural calcium carbonate can be added during the tissue papermaking process as an aqueous suspension, e.g. the suspension described above, subject or not to further dilution or partial upconcentration. Alternatively, it can be added during the tissue papermaking process in any appropriate solid form, e.g. in the form of a powder or in the form of a cake. Within the context of the present invention, it is also possible to provide an immobile phase, e.g. in the form of a cake or layer, comprising the surface-reacted natural calcium carbonate.

In one embodiment, the surface-reacted natural calcium carbonate is added during the tissue papermaking process in addition to other mineral fillers, such as one or more of calcium carbonate (such as ground natural calcium carbonate, based on limestone, marble, chalk and/or dolomite, and/or precipitated calcium carbonate), talc, titanium dioxide and kaolin clay.

When the surface-reacted natural calcium carbonate is added in the form of a suspension (or "slurry"), with or without additional other mineral fillers, said suspension preferably features a total mineral filler solids content of 1 to 80% solids as measured according to the method described in the Examples section below.

When the surface-reacted natural calcium carbonate is added in the form of a suspension (or "slurry"), with or without additional other mineral fillers, said suspension preferably features a viscosity of 1 to 3000, preferably 1 to 1000 mPas, and more preferably 1 to 500 mPas as measured according to the method described in the Examples section below.

In common tissue papermaking procedures, the tissue paper web is first formed by dewatering a slurry of tissue papermaking fibres (possibly including other additives, this total slurry being called the "furnish"), added to the tissue papermaking machine via a headbox, on a foraminous surface, such as a wire screen. The papermaking fibres most frequently used in tissue papers are virgin chemical wood pulps, however waste paper pulps (also called "recycled pulps") and admixtures with mechanical pulps are also used. Notably bleached sulphite and sulphate pulps are implemented. These tissue papermaking fibres may, in some cases, have been previously subjected to various degrees of refining to isolate fibres of a given, desired fineness.

In one embodiment of the invention, the surface-reacted natural calcium carbonate is added to and mixed with the slurry of tissue papermaking fibres (and possibly further usual additives) to form the furnish prior to introduction to the tissue papermaking machine, and notably prior to dewatering.

In another embodiment of the invention, multiple, superposed layers of furnish are added to the foraminous surface to form a layered tissue paper web. These layers may differ in constitution, but at least one of these includes the surface-reacted natural calcium carbonate according to the invention.

Dewatering of this tissue paper web is then generally continued to form a semi-dry tissue paper web, for example, on a press section by mechanically compacting the tissue paper web, or by through-drying the tissue paper web with hot air as it passes, for example, over one or more foraminous transfer fabrics or felts. In one embodiment, the tissue papermaking process according to the present invention implements such a step of mechanically compacting or through-drying the tissue paper web, or implements any conventional tissue paper web dewatering means known to the skilled person. It is of note that any or all of the dewatering steps may implement the further use of a vacuum or other means known to remove water from the tissue paper web.

Finally, this semi-dry tissue paper web is dried further or completely, to form the tissue paper, for example by exposing it to the surface of the Yankee dryer. A Yankee dryer is a large, generally steel, drum, wherein pressurised steam is used to provide a hot surface upon which the tissue paper web may ultimately be dried. In one embodiment, the tissue papermaking process according to the present invention implements such a step of exposing the tissue paper web to the surface of a Yankee dryer, or implements any conventional means known to the skilled person to further or completely dry the tissue paper web to form a tissue paper, such as via the use of an air cap burner or by through-drying.

It is common practice to "crepe" tissue paper or semi-dry tissue paper web, though uncreped tissue papers also exist. Creping involves mechanically compacting the tissue paper in the machine direction, and is generally performed by applying a flexible blade, or "doctor blade", against a Yankee dryer. Creping may be performed on the dry or wet tissue paper or tissue paper web. In one embodiment, the tissue papermaking process according to the present invention may implement such a step of creping the wet or dry tissue paper or tissue paper web, such as by applying a flexible blade, or "doctor blade", against a Yankee dryer, or by any conventional means known to the skilled person to crepe tissue paper.

Small amounts of functional chemical agents, such as wet strength or dry strength resins, humectants, oils, waxes, retention aids, bactericides, surfactants, sizers, debonders, softeners, crepe facilitating compositions, starches and various polyelectrolyte polymers are often added during the tissue papermaking process, or to the formed tissue paper, though typically only in small amounts. In one embodiment, the tissue papermaking process according to the present invention may implement the addition of one or more of the above functional chemical agents. The selection of the nature and amounts of such agents, such that they are compatible with the furnish or tissue paper, and with one another, and their implementation in the tissue papermaking process are known to the skilled man.

Following formation, the tissue paper (ply) may be subsequently cut and layered to form a tissue paper product featuring multiple plies. In one embodiment, the tissue papermaking process according to the present invention implements one or more steps of cutting the tissue paper. The process according to the invention may also involve one or more steps of layering two or more tissue paper plies to form a tissue paper product, wherein at least one ply is formed according to the tissue papermaking process of the present invention.

The process of tissue papermaking may further include steps of calendering and/or coating and/or embossing (quilting and/or rippling) and/or impregnating with a liquid, such as a lotion, and/or printing on the tissue paper in order to form the tissue paper product. In one embodiment, the tissue papermaking process according to the present invention may implement one or more of these further steps.

Resulting Tissue Paper Product

The tissue paper product of the invention is one obtained by the tissue papermaking process as described above.

The tissue paper product of the invention is alternatively characterised in that it comprises a surface-reacted natural calcium carbonate obtained by reacting a natural calcium carbonate with an acid and with carbon dioxide, wherein the carbon dioxide is formed in situ by the acid treatment and/or is supplied from an external source.

In a preferred embodiment, the tissue paper product of the invention notably contains from 2 to 20% by weight of surface-reacted natural calcium carbonate relative to the total tissue paper product weight. More preferably, it contains 3 to 15% by weight of surface reacted natural calcium carbonate relative to the total tissue paper product weight.

When additional mineral fillers are present in the tissue paper product in addition to the surface-reacted natural calcium carbonate, the total mineral filler content of the paper is preferably from 1 to 50% by weight, more preferably from 1 to 25% by weight, and most preferably from 1 to 15% by weight, relative to the tissue paper product weight.

In a preferred embodiment, the tissue paper product according to the invention features a basis weight per ply of 5 to 50 g/m2, as measured according to the method described in the Examples section herebelow. In another preferred embodiment, the tissue paper product comprises from 1 to 3 tissue paper plies, though the skilled man will appreciate that the selection of the number of plies forming the tissue paper product will depend on the final application of this tissue paper product.

In a preferred embodiment, the tissue paper product according to the invention features a softness of less than 6.0 TSA, preferably of less than 5.5 TSA, and more preferably of less than 3.5 TSA, as measured according to the method described in the Examples section herebelow.

Alternatively, in another preferred embodiment, at equal filler loading in a tissue paper of otherwise equal composition, the tissue paper product according to the invention features a softness, as measured according to the method described in the Examples section here below, that is at least 2 standard deviations less than the TSA value of an equivalent tissue paper product wherein the surface-reacted natural calcium carbonate is replaced with a standard calcium carbonate featuring a weight median diameter, as measured according to the method described in the Examples section herebelow, within 10% of the weight median diameter of the surface-reacted natural calcium carbonate, as measured according to the method described in the Examples section herebelow, and wherein the basis weight of the tissue paper product comprising the standard calcium carbonate, as measured according to the method described in the Examples section herebelow, is within 5% of the basis weight of the tissue paper product comprising the surface-reacted natural calcium carbonate.

Alternatively, in another preferred embodiment, the tissue paper product according to the invention features a softness, as measured according to the method described in the Examples section herebelow, that is at least 2 standard deviations less than the TSA value of an equivalent tissue paper product which does not contain any filler, and wherein the basis weight of the filler-free tissue paper product, as measured according to the method described in the Examples section herebelow, is within 5% of the basis weight of the tissue paper product comprising the surface-reacted natural calcium carbonate.

Finally, the tissue paper product according to the present invention is preferably facial tissue, toilet tissue paper, decorative and/or gift wrapping tissue, household and/or industrial tissue paper towels, tissue paper napkins or tissue paper cloths.

EXAMPLES

Measuring Methods

The following measurement methods are used to evaluate the parameters given in the following examples and claims.

Relative to a Mineral Filler in Slurry Form:

Solids Content

The slurry solids content (also known as "dry weight") is determined using a Moisture Analyser HR73 commercialised by Mettler-Toledo with the following settings: temperature of 120° C., automatic switch off 3, standard drying, 5-20 g of slurry.

Viscosity

The viscosity measured is a Brookfield viscosity measured using Brookfield RVTDV-II instrumentation at 100 rpm, and selecting the spindle such that the % mode value lies between 20 and 80.

pH

The pH of the aqueous suspension is measured using a standard pH-meter at approximately 22° C.

Specific Surface Area

The specific surface area is measured via the BET method according to ISO 9277 using nitrogen, following conditioning of the sample by heating at 250° C. for a period of 30 minutes.

Particle Size Distribution (Mass % Particles with a Diameter<X) and Weight Median Grain Diameter ($d_{50}$)

Weight median grain diameter and grain diameter mass distribution are determined via the sedimentation method, i.e. an analysis of sedimentation behaviour in a gravimetric field. The measurement is made with a Sedigraph™ 5120.

The method and the instrument are known to the skilled person and are commonly used to determine grain size of fillers and pigments. The measurement is carried out in an aqueous solution of 0.1 wt % $Na_4P_2O_7$. The samples were dispersed using a high speed stirrer and ultrasonic.

ISO Brightness R-457

R-457 ISO brightness was determined in accordance with ISO 2469 using Elrepho 3300 instrumentation.

Abrasion

Abrasion was measured using AT 2000 instrumentation (A Type 871001 Nr. 8602 (Prototype), C Serial Number 9560-9501) from the company Einlehner, using PK 2069 test bodies and 1 kg of a reference slurry of EMX-20 powder featuring a solids content 0.7 to 0.9% by weight, calibrated such that the reference provides an abrasion value of between 15.5 and 17.5 mg.

Relative to Handsheets Comprising a Mineral Filler:

Basis Weight

Handsheet basis weight is determined in accordance with DIN EN ISO 536 following handsheet conditioning over 48 hours in an environment having 50% relative humidity and a temperature of 23+/−1° C.

Thickness

Handsheet thickness is determined in accordance with SN EN ISO 534 following handsheet conditioning over 48 hours in an environment having 50% relative humidity and a temperature of 23+/−1° C., and using a micrometer with a test pressure of 10 N/cm$^2$.

Softness

Non-conditioned handsheet softness was evaluated using Tissue Softness Analyzer instrumentation (equipment number 01-01-26) from the company Emtec (Paper Testing Technology).

Bulk

Handsheet bulk, corresponding to the volume occupied by a gram of the handsheet, is determined by dividing the thickness of the handsheet by the mass per unit planar area of the handsheet, employing the appropriate units.

Example 1

Preparation of Mineral Filler Slurries

Test 1:

This test illustrates the preparation of an aqueous slurry a natural calcium carbonate of the prior art named Slurry A.

For this test, a slurry of-ground marble, commercialised by the company OMYA under the commercial name Hydrocarb 60 ME-78% is diluted to form a 65% solids slurry.

The resulting slurry of natural calcium carbonate, named Slurry A, features the characteristics presented in Table 1.

TABLE 1

| Tests | Unit | Slurry A |
|---|---|---|
| Solids content | % | 65 |
| Viscosity | mPas | 250 |
| pH | | 8.5 |

The natural calcium carbonate in aqueous Slurry A features the characteristics presented in Table 2.

TABLE 2

| Tests | Unit | Slurry A |
|---|---|---|
| Specific surface area Sedigraph ™ 5120 | m$^2$/g | 6.8 |
| <2 μm | wt % | 61 |
| <1 μm | wt % | 37 |
| Weight median particle diameter | μm at 50 weight % less than | 1.5 |
| Abrasion | mg | 17-18 |

Test 2:

This test illustrates the preparation of an aqueous slurry of surface-reacted natural calcium carbonate named Slurry B.

A finely divided natural calcium carbonate originating from Austria, was suspended to achieve a suspension of approximately 65% by weight of dry matter. The slurry thus formed is then treated by slow addition of phosphoric acid at a temperature of approximately 60° C., sufficient to provide a product featuring a BET specific surface area of 80 m$^2$/g and a weight median diameter of 1.5 μm.

The resulting slurry of surface-reacted natural calcium carbonate features the characteristics presented in Table 3.

TABLE 3

| Tests | Unit | Slurry B |
|---|---|---|
| Solids content | % | 10.6 |
| Viscosity | mPas | 121 |
| pH | | 7.2 |

The surface-reacted natural calcium carbonate in aqueous slurry features the characteristics presented in Table 4.

TABLE 4

| Tests | Unit | Slurry B |
|---|---|---|
| Specific surface area Sedigraph ™ 5120 | m$^2$/g | 80 |
| <2 μm | % | 91.0 |
| <1 μm | % | 6.3 |
| Weight median particle diameter | μm at 50 weight % less than | 1.52 |
| ISO Brightness | % | 94.0 |
| Abrasion | mg | 0.7 |

FIG. 1 illustrates an SEM image of this surface-reacted natural calcium carbonate.

Example 2

Preparation of Tissue Paper Handsheets

Handsheets featuring a basis weight of between 20 and 30 g/m$^2$ were prepared implementing the mineral filler slurries of tests 1 and 2. Handsheets were prepared so as to feature a dry mineral filler loading of 3, 6 and 10% by weight on the total weight of the handsheet. The fibre furnish used to form the handsheets consisted of 100% bleached sulphite fibres featuring 17° SR. Handsheets were prepared using a Rapid-Köthen sheet machine.

Example 3

Handsheet Analysis

The handsheets formed in Example 2 were then analysed according to the measurement methods described above. The results are collected in Table 5.

TABLE 5

| | Pulp alone | Pulp + Slurry A | | | Pulp + Slurry B | | |
|---|---|---|---|---|---|---|---|
| Weight CaCO$_3$ on total weight handsheet (%) | 0 | 3 | 6 | 10 | 3 | 6 | 10 |
| Handsheet measurements | | | | | | | |
| Basis weight (g/m$^2$) | 30.9 | 30.9 | 31.7 | 29.9 | 31.7 | 31.6 | 31.1 |
| Thickness (μm) | 65.2 | 65.2 | 65.4 | 65.3 | 70.0 | 70.2 | 70.6 |
| Softness (TSA) | 7.77 | n/a* | 6.46 | 5.90 | 5.95 | 4.09 | 3.15 |
| Bulk (cm$^3$/g) | 2.13 | 2.21 | 2.22 | 2.15 | 2.21 | 2.25 | 2.35 |
| Brightness R-457 + UV (%) | 72.8 | 74.7 | 76.4 | 78.0 | 74.8 | 74.7 | 78.3 |

*n/a = not available

Handsheets formed implementing the surface-reacted calcium carbonate according to the invention feature a significant improvement in softness at equivalent filler loading relative to handsheets formed implementing standard calcium carbonate.

The invention claimed is:

1. A tissue paper product comprising surface-reacted calcium carbonate, wherein the surface-reacted calcium carbonate is formed by treating natural calcium carbonate with carbon dioxide and one or more acids, wherein the carbon dioxide is formed in situ by the acid treatment and/or is supplied from an external source, and wherein the tissue paper product is characterized as having a softness of less than 6.0 TSA.

2. The tissue paper product according to claim 1, comprising from 2 to 20% by weight of surface-reacted calcium carbonate relative to the total tissue paper product weight.

3. The tissue product according to claim 1, comprising from 3 to 15% by weight of surface-reacted calcium carbonate relative to the total tissue paper product weight.

4. The tissue paper product according to claim 1, comprising a total mineral filler of from 1 to 50% by weight relative to the tissue paper product weight.

5. The tissue paper product according to claim 1, comprising a total mineral filler of from 1 to 25% by weight relative to the tissue paper product weight.

6. The tissue paper product according to claim 1, comprising a total mineral filler of from 1 to 15% by weight relative to the tissue paper product weight.

7. The tissue paper product according to claim 1, characterized as having a basis weight per tissue paper ply of 5 to 50 g/m$^2$.

8. The tissue paper product according to claim 1, comprising from 1 to 3 tissue paper plies.

9. The tissue paper product according to claim 1, characterized as having a softness of less than 5.5 TSA.

10. The tissue paper product according to claim 1, characterized as having a softness of less than 3.5 TSA.

11. The tissue paper product according to claim 1, characterized in having a softness that is at least 2 standard deviations less than the TSA value of an equivalent tissue paper product, wherein the surface-reacted calcium carbonate is replaced with a standard calcium carbonate featuring a mean diameter within 10% of the mean diameter of the surface-reacted calcium carbonate, and wherein the basis weight of the tissue paper product comprising the standard calcium carbonate is within 5% of the basis weight of the tissue paper product comprising the surface-reacted calcium carbonate.

12. The tissue paper product according to claim 1, characterized in having a softness that is at least 2 standard deviations less than the TSA value of an equivalent tissue paper product which does not contain any filler, and wherein the basis weight of the filler-free tissue paper product is within 5% of the basis weight of the tissue paper product comprising the surface-reacted calcium carbonate.

13. The tissue paper product according to claim 1, which is a facial tissue, a toilet tissue paper, decorative and/or gift wrapping tissue, a household and/or industrial tissue paper towel, a tissue paper napkin or a tissue paper cloth.

14. The tissue paper product according to claim 1, wherein the surface-reacted calcium carbonate is prepared as an aqueous suspension having a pH of greater than 6.5 measured at 20° C.

15. The tissue paper product according to claim 1, wherein the surface-reacted calcium carbonate is prepared as an aqueous suspension having a pH of greater than 7.0 measured at 20° C.

16. The tissue paper product according to claim 1, wherein the surface-reacted calcium carbonate is prepared as an aqueous suspension having a pH of greater than 7.5 measured at 20° C.

17. The tissue paper product according to claim 1, wherein the natural calcium carbonate is a marble, a calcite, a chalk, a dolomite, a limestone, or any mixtures thereof.

18. The tissue paper product according to claim 1, wherein the acid has a p$K_a$ at 25° C. of 2.5 or less.

19. The tissue paper product according to claim 1, wherein the acid has a p$K_a$ at 25° C. of 0 or less.

20. The tissue paper product according to claim 19, wherein the acid is sulphuric acid, hydrochloric acid, or mixtures thereof.

21. The tissue paper product according to claim 1, wherein the acid has a p$K_a$ at 25° C. of from 0 to 2.5.

22. The tissue paper product according to claim 21, wherein the acid is $H_2SO_3$, $HSO_4^-$, $H_3PO_4$, oxalic acid, or any mixtures thereof.

23. The tissue paper product according to claim 1, wherein the acid is phosphoric acid.

24. The tissue paper product according to claim 1, wherein the molar ratio of the acid to the natural calcium carbonate is from 0.05 to 4.

25. The tissue paper product according to claim 1, wherein the molar ratio of the acid to the natural calcium carbonate is from 0.1 to 2.

* * * * *